United States Patent Office 2,841,605
Patented July 1, 1958

2,841,605

PRODUCTION OF HETEROCYCLIC DITHIOPHOSPHORIC ESTERS

William M. Lanham, Charleston, W. Va., assignor to Union Carbide Corporation, a corporation of New York No Drawing. Application January 12, 1955
Serial No. 481,495

13 Claims. (Cl. 260—461)

This invention relates to the production of a novel class of acyloxyalkyl esters of heterocyclic dithiophosphoric acids containing phosphorus in a heterocyclic ring. More especially it concerns the production of a novel class of unsubstituted and alkyl-substituted 2-thiono-1,3,2-dioxaphosphorinanomercaptoalkyl and 2 - thiono - 1,3,2-dioxaphospholanomercaptoalkyl esters of monocarboxylic acids and hydrocyanic acid, having structures corresponding to the formula

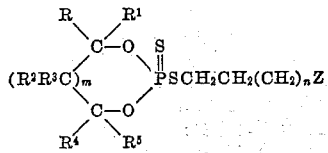

where in R, R$^1$, R$^2$, R$^3$, R$^4$ and R$^5$, respectively, designates a radical of the class consisting of hydrogen and the alkyl radicals; $m=0$ or 1; Z designates a member of the class consisting of

and —CN radicals wherein R$^6$ designates a radical of the class consisting of hydrogen, the saturated and olefinically unsaturated aliphatic hydrocarbon radicals, the aromatic monocyclic hydrocarbon radicals, and the corresponding halogen-substituted aliphatic and aromatic hydrocarbon radicals; and $n$ is 0 or 1.

The novel compounds of this invention are useful as pesticides. Certain of the compounds have proven effective in aqueous suspensions for the control of bean aphids, and red spider mites and Mexican beetle larvae. The compounds also have potential utility as plasticizers for synthetic resins, and as corrosion inhibitors, flotation agents and petroleum additives.

The novel compounds can be produced by reacting a heterocyclic dithiophosphoric acid of the formula

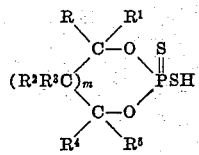

where in R, R$^1$, R$^2$, R$^3$, R$^4$ and R$^5$, respectively, designates a radical of the class consisting of hydrogen and the alkyl groups, and $m$ is 0 or 1, with an ester of the formula CH$_2$=CH(CH$_2$)$_n$Z, wherein $n$ is 0 or 1, and Z is a radical of the class consisting of —CN and the

radicals wherein R$^6$ designates a radical of the class consisting of hydrogen, the saturated and olefinically unsaturated aliphatic hydrocarbon radicals, the aromatic monocyclic hydrocarbon radicals, and the corresponding halogen-substituted aliphatic and aromatic hydrocarbon radicals.

The reaction can be conducted in the presence of a small amount of a suitable condensation catalyst, such as the aliphatic tertiary amines, e. g., triethylamine; and the alkali metal hydroxides and carbonates. However, the use of a catalyst is not necessary.

When the unsaturated ester starting material is highly reactive, a polymerization inhibitor such as hydroquinone preferably is present in the reaction mixture.

It is generally preferred to conduct the reaction in the presence of an inert solvent, particularly where one or both of the reactants are solids. Useful inert solvents include saturated esters of fatty acids, such as ethyl acetate, amyl acetate, 2-ethylhexyl acetate, methyl propionate, and methyl and ethyl butyrates; ketones such as acetone and methyl isobutyl ketone; ethers such as dioxane; aromatic compounds such as benzene, toluene, the xylenes, chlorobenzene and nitrobenzene; carbon tetrachloride; chloroform; trialkyl phosphates such as triethyl and tri-(2-ethylhexyl)phosphates; and saturated nitriles such as acetonitrile and propionitrile.

The reaction can be conducted at temperatures within the range from −20° C. to about 150° C., btu temperatures ranging from around 25° C. to about 100° C. are preferred in the interest of good yields of product. Preferably the unsaturated carboxylic ester, which may contain a polymerization inhibitor, is added slowly in small successive amounts to a solution of the phosphorus-containing reactant in an inert solvent of the type described until approximately equimolar portions have reacted, as illustrated by the equation

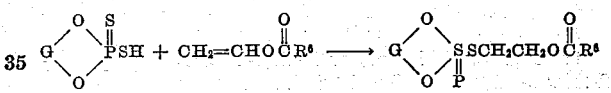

where G represents a hydrocarbon radical of the formula —CRR$^1$(CR$^2$R$^3$)$n$CR$^4$R$^5$— wherein R, R$^1$, R$^2$, R$^3$, R$^4$ and R$^5$, respectively, designates a member of the class consisting of hydrogen and the alkyl radicals; $n$ is 0 or 1; and R$^6$ is as aforesaid.

The novel products can be recovered from the reaction mixture by fractionally distilling the latter under high vacuum to remove any unreacted starting material, solvent and any by-products. Preferably, however, the reaction mixture is first washed with a dilute solution of sodium bicarbonate or the equivalent, washed with water, and the washed product stripped of unreacted materials and solvent by distillation under high vacuum. The desired product is recovered in good purity as a still residue.

The heterocyclic dithiophosphoric acids used as starting materials can be made by reacting phosphorus pentasulfide with an alkane-1,2-diol or an alkane-1,3-diol at temperatures within the range from 25° C. to 100° C. and above, preferably in the presence of an inert solvent for the diol and reaction products, and removing the by-product hydrogen sulfide as formed. Such a process is described in my pending application, Serial No. 387064, filed October 19, 1953.

Among heterocyclic dithiophosphoric acids useful in the process may be mentioned: 2 - mercapto - 2 - thiono-1,3,2-dioxaphosphorinane, and the 4-ethyl-, 4-butyl-, 4-(2-ethylhexyl)-, 4-tetradecyl-, 5-ethyl-, 5-butyl-, 5-decyl-, 5-heptadecyl-, 4,5-diethyl-, 4-methyl-5-ethyl-, 4,5-dibutyl-, 4 - propyl-5-tetradecyl-, 5-ethyl-5-butyl-, 5,5-dibutyl-, 5-butyl - 5 - dodecyl-, 4,4,6-trimethyl-, and 4,4,5,5-tetramethyl-substituted 2 - mercapto - 2 - thiono - 1,3,2-dioxaphosphorinanes; and the corresponding substituted and unsubstituted 2 - mercapto - 2 - thiono - 1,3,2 - dioxaphospholanes.

Among unsaturated esters of hydrocyanic acid and of monocarboxylic acids of the formula R⁶COOH useful in the process may be mentioned the vinyl and allyl esters of hydrocyanic acid, and corresponding esters of fatty acids such as formic, acetic, propionic, butyric, caproic, 2-ethylhexanoic, capric, and stearic acids; halogen-substituted fatty acids such as the chloro- and bromo-acetic, propionic and butyric acids; oleic acid; benzoic acid; and the o-, m- and p-chloro-substituted and o-, m- and p-alkyl-substituted benzoic acids.

The following examples will serve to illustrate the invention.

*Example 1*

To an agitated solution of 68 grams (0.3 mol) of 5,5-diethyl-2-mercapto-2-thiono-1,3,2-dioxaphosphorinane in 200 grams of toluene there were added dropwise during 20 minutes 86 grams (1 mol) of vinyl acetate, while maintaining the reaction temperature of 40°–45° C. After heating at this temperature for 2.5 additional hours, and then at 25° C. for about 16 hours, the reaction mixture was stripped by distillation to a kettle temperature of 70° C. under less than 4 mm. of mercury pressure. There was thus obtained a 95% yield of 2-(2-acetoxyethylmercapto)-5,5-diethyl-2-thiono-1,3,2-dioxaphosphorinane as a brown solid residue having the following properties: acidity=0.05 cc. of 1 normal KOH/g.; $n_D^{30}$=1.5220. Analysis, percent by weight: percent S=20.6 (theory=20.52); percent P=10.42; (theory=9.92); percent C=40.25 (theory=42.28); percent H=6.50 (theory=6.94).

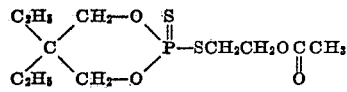

*Example 2*

To 72 grams (0.3 mol) of 5-ethyl-2-mercapto-4-propyl-2-thiono-1,3,2-dioxaphosphorinane there were added during 20 minutes dropwise 86 grams (1 mol) of vinyl acetate, while maintaining the kettle temperature at 42°–45° C. After heating the reaction mixture at 42°–50° C. for 5 additional hours, it was stripped by distillation to a kettle temperature of 70° C. under less than 4 mm. of mercury pressure. The resultant 2-(2-acetoxyethylmercapto)-5-ethyl-4-propyl-2-thiono-1,3,2-dioxaphosphorinane was secured in 95% yield, based upon the phosphorus-containing reactant, in the form of a fluid residue having the following properties: acidity=0.07 cc. of normal KOH/g; $n_D^{30}$=1.5120; molecular weight (ebullioscopic)=323.5 (theory=326.4). Analysis, percent by weight: percent P=9.53 (theory=9.49); percent S=19.80 (theory=19.64); percent C=44.57 (theory=44.16); percent H=7.19 (theory=7.10).

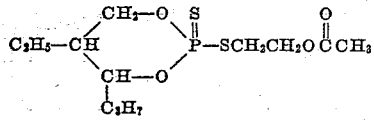

*Example 3*

With agitation 86 grams (1 mol) of vinyl acetate were added dropwise to a solution of 64 grams (0.3 mol) of 2-mercapto-2-thiono-4,6-trimethyl-1,3,2-dioxaphosphorinane in 100 grams of toluene, with heating to maintain a reaction temperature of 42°–45° C. during the addition and for an additional 5 hours. The reaction mixture then was neutralized with a dilute aqueous sodium bicarbonate solution, washed with water until neutral toward litmus paper, and stripped by distillation to a kettle temperature of 100° C. under less than 4 mm. of mercury pressure. The resultant 2-(2-acetoxyethylmercapto)-2-thiono-4,4,6-trimethyl-1,3,2-dioxaphosphorinane was obtained as a yellow liquid residue having the following properties: acidity=0.05 cc. of normal KOH/g.; $n_D^{30}$=1.5239. Analysis, percent by weight: percent S=22.40 (theory=21.49); percent P=10.68 (theory=10.38); percent C=40.02 (theory=40.24); percent H=6.70 (theory=6.42).

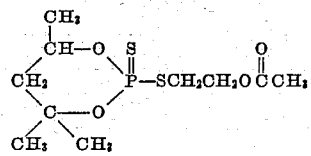

*Example 4*

To an agitated suspension of 45 grams (0.2 mol) of 5,5-diethyl-2-mercapto-2-thiono-1,3,2-dioxaphosphorinane in 150 grams of toluene maintained at 25° C. there were added during 8 minutes 24 grams (0.2 mol) of vinyl chloroacetate inhibited with 0.02 gram of hydroquinone. The agitation was continued at 25° C. for 2.25 hours, after which it was heated at ground 45°–50° C. for a total of 19 hours, and allowed to stand for 4 days at 25° C., after which it was neutralized with a concentrated aqueous solution of sodium bicarbonate, washed with water until neutral to litmus and stripped by distillation to a kettle temperature of 100° C. under less than 2 mm. of mercury pressure. The resultant 2-(2-chloroacetoxyethylmercapto)-5,5-diethyl-2-thiono-1,3,2-dioxaphosphorinane was recovered as a light brown fluid residue having the following properties: $n_D^{30}$=1.5314. Analysis, percent by weight: percent P=9.26 (theory=8.94); percent C=38.38 (theory=38.10); percent H=5.91 (theory=5.82); percent S=19.50 (theory=18.50; percent Cl=9.73 (theory=10.22).

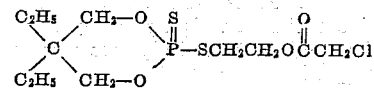

*Example 5*

To an agitated suspension of 45 grams (0.2 mol) of the phosphorus-containing starting material recited in Example 4 in 150 grams of toluene, there were added dropwise 62 grams (0.2 mol) of vinyl oleate inhibited with 0.06 gram of hydroquinone, while maintaining the mixture at 25° C. The mixture then was agitated at 25° C. for 2.25 hours, was heated at 50° C. for 2½ hours, and allowed to stand at 25° C. for 8 days. The mixture then was neutralized with concentrated aqueous sodium bicarbonate solution, washed with water until neutral to litmus and stripped by distillation to a kettle temperature of 100° C. under less than 2 mm. of mercury. The resultant 5,5-diethyl-2-(2-oleoyloxyethylmercapto)-2-thiono-1,3,2-dioxaphosphorinane was obtained as a brown liquid residue having the following properties: acidity=0.25 cc. of 1 normal KOH/g.; salt=0.007 cc. of 1 N HClO₄/gram; $n_D^{30}$=1.4970. Analysis, percent by weight: percent P=5.87 (theory=5.79); percent C=60.80 (theory=60.63); percent H=9.70 (theory =9.61); percent S=12.1 (theory=11.98).

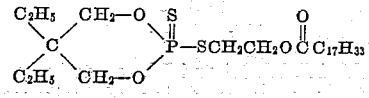

*Example 6*

To an agitated suspension of 0.2 mol of 5,5-diethyl-2-mercapto-2-thiono-1,3,2-dioxaphosphorinane in 150 grams of toluene held at 25° C. there were added dropwise 0.2 mol of vinyl 2-ethylhexanoate, inhibited with 0.03 gram of hydroquinone. The reaction mixture, after heating at 50° C. for 2.5 hours and holding at 25° C. for about 4.5 days was neutralized with a concentrated aqueous solution of sodium bicarbonate, diluted with 100 cc. of ethyl ether, washed with water until neutral to litmus, and stripped by distillation to a kettle temperature of 100° C. under less than 2 mm. of mercury pressure. The resultant 5,5 - diethyl - 2 - (2 - ethylhexanoyloxyethylmercapto) - 2 - thiono - 1,3,2 - dioxaphosphorinane was a brown liquid residue having the following properties: acidity=0.06 cc. of 1 normal KOH/g.; $n_D^{30}$=1.5033. Analysis, percent by weight: percent P=8.19; percent S=15.15; percent C=51.0; percent H=8.29.

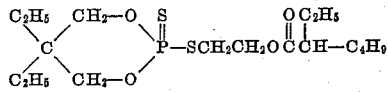

Example 7

To an agitated suspension in 150 grams of toluene of 0.2 mol of the phosphorus-containing reactant recited in Example 6 and 0.06 gram of hydroquinone held at 25° C. there were added slowly during 20 minutes 0.2 mol of vinyl stearate. The reaction mixture was allowed to stand at 25° for 45.5 hours, heated at 50° C. for 2.5 hours, and allowed to stand at 25° C. for a total of around 64 hours. The mixture was neutralized with a concentrated aqueous solution of sodium bicarbonate, washed with water until neutral to litmus, and stripped by distillation to a kettle temperature of 100° C. under less than 2 mm. of mercury. The resultant 5,5-diethyl-2-(2-octadecanoyloxyethylmercapto) - 2 - thiono - 1,3,2 - dioxaphosphorinane was obtained as a brown liquid residue having the following properties: acidity=0.04 cc. of normal KOH/g.; salt=0.02 cc. of N HClO₄/g.; $n_D^{30}$=1.4911. Analysis, percent by weight: percent P=5.88 (theory =5.77); percent C=60.14 (theory=60.41); percent H =9.84 (theory=9.95); percent S=11.50 (theory=11.94); percent yield=79.

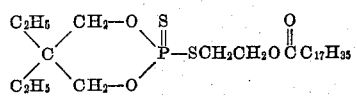

Example 8

To an agitated suspension of 0.2 mol of 5,5-diethyl-2-mercapto-2-thiono-1,3,2-dioxaphosphorinane in 150 grams of toluene held at 25° C. there were added dropwise 0.2 mol of vinyl benzoate inhibited with 0.03 gram of hydroquinone. After heating at 50° C. for 2.5 hours and holding at 25° C. for a total of about 114 hours, the reaction mixture was washed with concentrated aqueous sodium bicarbonate, diluted with 100 cc. of ethyl ether, washed with water until neutral to litmus, and stripped by distillation to a kettle temperature of 100° C. under less than 2 mm. of mercury pressure. The resultant 2-(2-benzoyloxyethylmercapto)-5,5-diethyl-2-thiono-1,3,2-dioxaphosphorinane was recovered as a viscous liquid residue having the following properties: acidity =0.03 cc. of normal KOH/g.; salt=0.02 cc. of normal HClO₄/g.; $n_D^{30}$=1.5595. Analysis, percent by weight: percent P=8.60 (theory=8.27); percent C=51.33 (theory=51.35); percent H=6.25 (theory=6.19); percent S=17.10 (theory=17.13); percent yield=92.

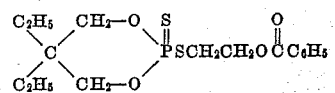

Example 9

During 15 minutes, 53 grams (1 mol) of acrylonitrile were added dropwise to 48 grams (0.28 mol) of 2-mercapto - 4 - methyl - 2 - thiono - 1,3,2 - dioxaphospholane held at 42°-50° C. After holding the reaction mixture at 25° C. for a total of 50 hours, the reaction mixture was stripped by distillation to a kettle temperature of 70° C. under less than 3 mm. of mercury. The resultant 2 - (2 - cyanoethylmercapto) - 4 - methyl - 2 - thiono-1,3,2-dioxaphospholane was secured as a brown liquid residue having the following properties: acidity=0.12 cc. of normal KOH/g.; $n_D^{30}$=1.5528. Analysis, percent by weight: percent P=13.88; percent S=26.9; percent N=5.64; percent C=31.80; percent H=4.51. A 97 percent yield was secured, based upon the phosphorus-containing reactant.

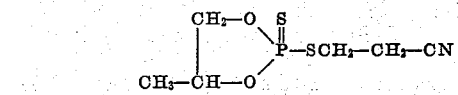

Example 10

Following the general procedure described in Example 9, the reaction of one mol of acrylonitrile with 0.3 mol of 5-ethyl-2-mercapto-4-propyl-2-thiono-1,3,2-dioxaphosphorinane gave an 87% yield of 2-(2-cyanoethylmercapto) - 5 - ethyl - 4 - propyl - 2 - thiono - 1,3,2 - dioxaphosphorinane as a liquid residue having the following properties: acidity=0.06 cc. of normal KOH/g.; $n_D^{30}$=1.5315; molecular weight (ebullioscopic)=301.6 (theory=293.4). Analysis, percent by weight: percent P=10.52 (theory=10.55); percent N=4.40 (theory =4.78); percent C=45.09 (theory=45.02); percent H=6.95 (theory=6.87).

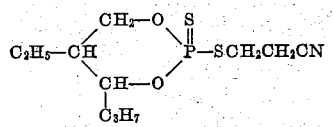

Example 11

To an agitated solution of 0.3 mol of 2-mercapto-2-thiono - 4,4,6 - trimethyl - 1,3,2 - dioxaphosphorinane in 100 grams of toluene there were added dropwise during 15 minutes at a reaction temperature of 42° C., one mol of acrylonitrile. The reaction mixture then stood at 25° C. for 16 hours, and then was heated for 30 minutes at 45°-50° C., and thereafter stripped by distillation to a kettle temperature of 100° C. under less than 2 mm. of mercury pressure. The resultant residue was dissolved in 100 cc. of toluene, neutralized with dilute aqueous sodium bicarbonate, washed with water, and stripped by distillation to a kettle temperature of 100° C. under less than 3 mm. of mercury. The resultant 2-(2-cyanoethylmercapto) - 2 - thiono -4,4,6 - trimethyl - 1,3,2 - dioxaphosphorinane was obtained as a red viscous liquid having the following properties: acidity=0.20 cc. of normal KOH/g.; $n_D^{30}$=1.5457. Analysis, percent by weight: percent P=11.38; percent S=24.0; percent N=3.98; percent C=40.52; percent H=6.21; percent yield=55, based upon the phosphorus-containing reactant.

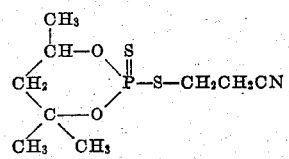

The invention hereindescribed is susceptible of modification within the scope of the appended claims.

I claim:

1. As new compounds, heterocyclic phosphorus-containing esters having structures corresponding to the formula

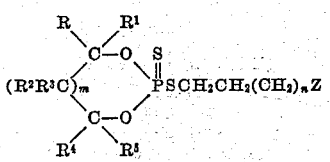

wherein R, R¹, R², R³, R⁴ and R⁵, respectively, designates a radical of the class consisting of hydrogen and the alkyl radicals; m is an integer from 0 to 1; Z designates a member of the class consisting of

and —CN radicals wherein R⁶ represents a radical of the class consisting of hydrogen, the saturated aliphatic hydrocarbon radicals, the monocyclic aromatic hydrocarbon radicals, and the corresponding halogen-substituted aliphatic and aromatic hydrocarbon radicals, and the $-(CH_2)_7CH=CHC_8H_{17}$ radical; and $n$ is an integer from 0 to 1.

2. As new compounds, 2-(2-acetoxyethylmercapto)-2-thiono derivatives of 1,3,2-dioxaphosphorinanes having at least one alkyl radical attached to at least one carbon atom of the dioxaphosphorinane ring, the other ring carbon atoms having 1 to 2 hydrogen atoms attached thereto.

3. As new compounds, 2-(2-cyanoethylmercapto)-2-thiono derivatives of 1,3,2-dioxaphosphorinanes having at least one alkyl radical attached to at least one carbon atom of the dioxaphosphorinane ring, the other ring carbon atoms having 1 to 2 hydrogen atoms attached thereto.

4. As a new compound, 2-(2-cyanoethylmercapto)-5-ethyl-4-propyl-2-thiono-1,3,2-dioxaphosphorinane.

5. As new compounds, 2-(2-cyanoethylmercapto)-2-thiono derivatives of a 1,3,2-dioxaphospholane having at least one alkyl radical attached to at least one carbon atom of the dioxaphospholane ring, the other ring carbon atom having 1 to 2 hydrogen atoms attached thereto.

6. As new compounds, 2-(2-chloroacetoxyethylmercapto)-2-thiono derivatives of 1,3,2-dioxaphosphorinanes having at least one alkyl radical attached to at least one carbon atom of the dioxaphosphorinane ring.

7. As new compounds, 2-(2-benzoyloxyethylmercapto)-2-thiono-1,3,2-dioxaphosphorinanes having at least one alkyl radical attached to at least one carbon atom of the dioxaphosphorinane ring, the other ring carbon atoms having 1 to 2 hydrogen atoms attached thereto.

8. Process for producing heterocyclic phosphorus-containing esters, which comprises reacting a heterocyclic phosphorus-containing acid of the formula

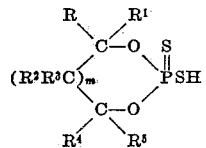

wherein R, R¹, R², R³, R⁴ and R⁵, respectively, designates a radical of the class consisting of hydrogen and the alkyl groups, and $m$ is an integer from 0 to 1, with an ester of the formula $CH_2=CH(CH_2)_nZ$, wherein $n$ is an integer from 0 to 1, and Z is a radical of the class consisting of —CN and the

radicals wherein R⁶ is a radical of the class consisting of hydrogen, the saturated aliphatic hydrocarbon radicals, the aromatic monocyclic hydrocarbon radicals, and the corresponding halogen-substituted aliphatic and aromatic hydrocarbon radicals, and the $-(CH_2)_7CH=CHC_8H_{17}$ radical.

9. Process for producing heterocyclic phosphorus-containing esters, which comprises reacting a heterocyclic dithiophosphoric acid of the formula

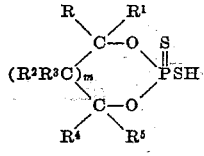

wherein R, R¹, R², R³, R⁴ and R⁵, respectively, designates a radical of the class consisting of hydrogen and the alkyl groups, and $m$ is an integer from 0 to 1, with an alkenyl ester of an alkanoic acid, at a temperature within the range between about —20° C. and about 150° C., said alkenyl group having 2 to 3 carbon atoms.

10. Process for producing heterocyclic phosphorus-containing esters, which comprises reacting a heterocyclic dithiophosphoric acid of the formula

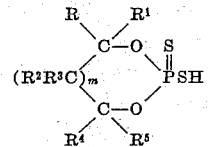

wherein R, R¹, R², R³, R⁴ and R⁵, respectively, designates a radical of the class consisting of hydrogen and the alkyl groups, and $m$ is an integer from 0 to 1, with an alkenyl ester of a halo-alkanoic acid, at a temperature within the range between about —20° C. and about 150° C., said alkenyl group having 2 to 3 carbon atoms.

11. Process for producing heterocyclic phosphorus-containing esters, which comprises reacting a heterocyclic dithiophosphoric acid of the formula

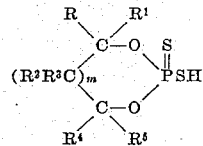

wherein R, R¹, R², R³ R⁴ and R⁵, respectively, designates a radical of the class consisting of hydrogen and the alkyl groups, and $m$ is an integer from 0 to 1, with an alkenyl ester of hydrocyanic acid, at a temperature within the range between about —20° C. and about 150° C., said alkenyl group having 2 to 3 carbon atoms.

12. Process for producing heterocyclic phosphorus-containing esters, which comprises reacting vinyl oleate with a heterocyclic dithiophosphoric acid of the formula

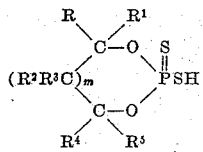

wherein R, R¹, R², R³, R⁴ and R⁵, respectively, designates a radical of the class consisting of hydrogen and the alkyl groups, and $m$ is an integer from 0 to 1, at a temperature within the range between about —20° C. and about 150° C.

13. Process for producing heterocyclic phosphorus-containing esters, which comprises reacting vinyl benzoate with a heterocyclic dithiophosphoric acid of the formula

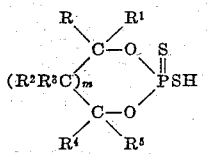

wherein R, R¹, R², R³, R⁴ and R⁵, respectively, designates a radical of the class consisting of hydrogen and the alkyl groups, and $m$ is an integer from 0 to 1, at a temperature within the range between about —20° C. and about 150° C.

References Cited in the file of this patent
UNITED STATES PATENTS
2,791,574    Lanham _____ May 7, 1957